United States Patent [19]

Kelley

[11] 4,137,612
[45] Feb. 6, 1979

[54] BUOYANT PELLET COVERING FOR SWIMMING POOLS

[76] Inventor: Robert V. Kelley, 837 Eton Dr., Burbank, Calif. 91504

[21] Appl. No.: 785,094

[22] Filed: Apr. 6, 1977

[51] Int. Cl.$^2$ .............................................. F24J 3/02
[52] U.S. Cl. .................................... 126/271; 4/172.15
[58] Field of Search ..................... 126/270, 271; 4/172, 4/172.12, 172.14, 172.17, 172.18

[56] References Cited

U.S. PATENT DOCUMENTS

| | | | |
|---|---|---|---|
| 3,072,920 | 1/1963 | Yellott | 126/271 X |
| 3,411,163 | 11/1968 | Myers, Jr. | 126/271 X |
| 3,552,567 | 1/1971 | Arp | 4/172 |
| 3,908,632 | 9/1975 | Poulsen | 126/271 |
| 3,984,881 | 10/1976 | Gerlach | 126/271 X |
| 3,998,204 | 12/1976 | Fuchs et al. | 126/271 |

FOREIGN PATENT DOCUMENTS 236337 10/1960 Australia .................................. 126/271

Primary Examiner—William F. O'Dea
Assistant Examiner—Larry Jones

[57] ABSTRACT

A solar heating apparatus is disclosed herein useful as a swimming pool cover whereby the sun's rays can penetrate the apparatus and heat the water therebeneath. The apparatus includes a multiplicity of floatable individual and separate balls, pellets or units of a predetermined geometry which cooperate with each other to cover the surface of a given body of water. Each unit includes a lower surface or panel of transparent, plastic material and an upper surface or panel of opaque, plastic material. A storage container is located adjacent to the pool and a collection device including a pump and related conduits is provided for gathering the multiplicity of pellets and transporting them to the storage container. A pellet dispersal device is provided for transporting the pellets back to the pool surface which also includes the pump and conduits.

6 Claims, 5 Drawing Figures

— • — • — • —  NORMAL WATER FLOW
— — — — —  COLLECTION (SOLAR UNITS TO STORAGE)
———→———→  SOLAR UNITS RETURN TO POOL

BUOYANT PELLET COVERING FOR SWIMMING POOLS

BACKGROUND OF THE INVENTION

1. Field of the Invention

This invention relates to solar heaters for swimming pools and more particularly to a novel heating apparatus including a plurality of small pellets or discs intended to be floated on the water surface whereby the water may be heated via the rays of the sun.

2. Brief Description of the Prior Art

In the past, swimming pools or other large bodies of water have been expensive to heat becuase of the large volume of water involved and the loss of heat evaporated into the air above the water. Even in warm air climates where the sun heats the water to its desirable temperature during the daytime, the water cools during the night to an undesirable temperature when the ambient temperature drops. Additionally, heat loss is experienced due to the wind passing over the body of water. In colder climates, the temperature of the water is not appreciably increased even during the daytime because of the constant loss of heat to the cool air. Thus, conventional heating equipment is required to maintain a suitable water temperature if there is to be optimum use of a pool and such equipment is costly to install and expensive to operate.

Some attempts have been made to employ solar heating as an expedient for maintaining pool water at a comfortable swimming temperature. These expedients have generally centered around the employment of coils of pipe or tubing exposed on a roof of a building and connected to the pool circulating water supply. Some heat is, in fact, captured by this expedient. However, such a system naturally requires power to pump pool water through the pipes and then back into the pool.

In other instances, solar heating has been made utilizing floating units or blankets and such devices are disclosed in U.S. Pat. Nos. 3,893,443, 3,453,666 and 3,072,920. However, these attempts have their limitations in that the various heat absorbing materials normally employed are heavy and have a tendency to sink below the surface unless adequate means are provided to support the material at the sides and ends. Usually this also means that such a cover must extend entirely across the pool when in use and, consequently, may become cumbersome to remove when the pool is used and to replace it afterwards.

Furthermore, many of the floating units that are employed in the prior art do not completely engage or touch each other when riding on the surface of the body of water so that collectively, a substantial surface area of the pool is exposed to the air for radiation of heat into ambient atmosphere. In other instances, the units are not provided with any means for adequate separation between the top and bottom panels so that the top panel is subject to gravity deviation for stretching so that the air filled chamber or compartment separating the opposing surfaces of the top and bottom panels collapses and therefore is not serving its intended purpose. One of the most annoying problems resides in the collection of the floating units and their storage. Each separate unit must be lifted from the pool surface and stacked at poolside.

Therefore, there has been a long standing need to provide a solar heating apparatus which may be readily installed or removed from a surface of a body of water and when so installed, provides a cover for maintaining a body of water in a heated condition.

SUMMARY OF THE INVENTION

In view of the foregoing, the present invention provides a novel solar heating apparatus for maintaining a heated water temperature for a large body of water by providing a plurality of air-filled, buoyant units so that the plurality of units when properly arranged cover the total surface of the body of water. In one form of the invention, each unit comprises a top and bottom surface of plastic material wherein the top panel is opaque and the bottom panel is transparent and wherein the top and bottom panels are separated by the presence of an air-filled compartment therebetween. A storage container is located at pool-side and collection means are employed for gathering the units and transporting them to the storage container. A dispersing means is employed for dispersing the units from the container onto the pool surface.

Therefore, it is among the primary objects of the present invention to provide a novel solar heating apparatus for maintaining the heated temperature of a large body of water.

Another object of the present invention is to provide an improved solar heating means for a large body of water which floats upon the water surface when in use and which is easy to remove from the pool or to install by automatic means.

Still another object of the present invention is to provide a novel solar heating apparatus for maintaining pool water temperature which is sufficiently effective in capturing the heat of the sun and transferring the heat to the water beneath.

Another object of the present invention is to provide a solar heating apparatus for maintaining temperature of a body of water which is simple and inexpensive to manufacture and install.

Still a further object resides in providing a novel solar heating apparatus having a plurality of units of specific geometrical configuration adapted to combine on the surface of the water to maintain the temperature thereof and having automatic collection and dispersal means for the units.

BRIEF DESCRIPTION OF THE DRAWINGS

The features of the present invention which are believed to be novel are set forth with particularity in the appended claims. The present invention, both as to its organization and manner of operation, together with further objects and advantages thereof, may best be understood by reference to the following description, taken in connection with the accompanying drawings in which:

DESCRIPTION OF THE PREFERRED EMBODIMENT

Figure 1:
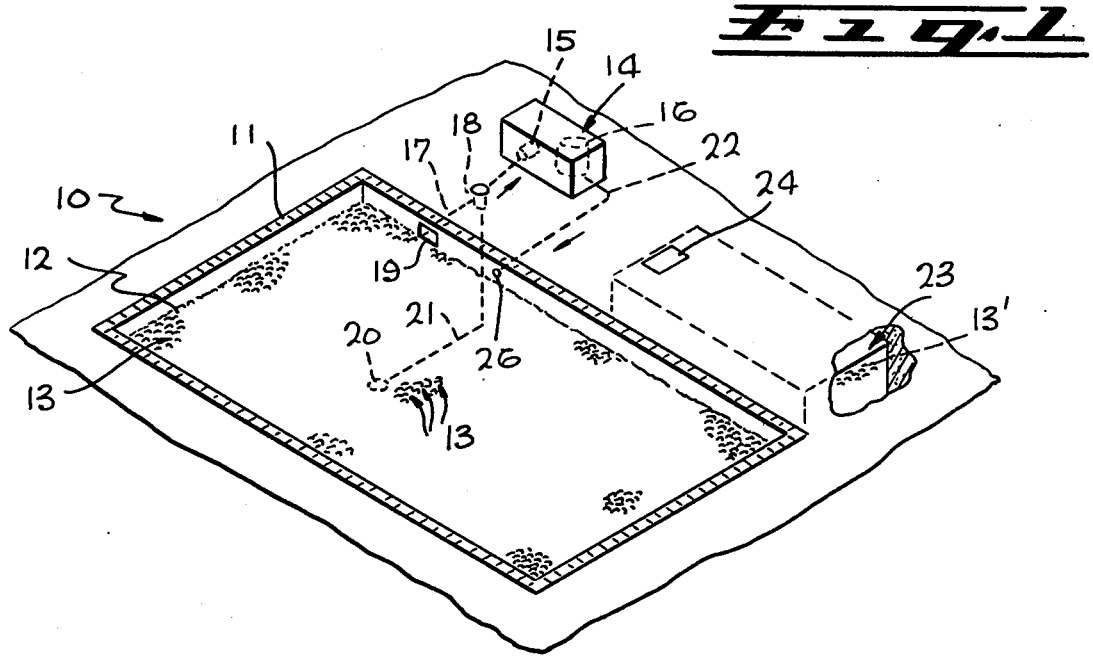
FIG. 1 is a top perspective view of the novel solar heating apparatus of the present invention.

Referring to FIG. 1, a conventional swimming pool is illustrated in the general direction of arrow 10 which includes a rectangular coping 11 defining the perimeter of the pool which includes a body of water illustrated in general by the numeral 12. Disposed on the surface of the pool 12, there is provided a plurality of individual and separate floating solar heating units such as the unit identified by numeral 13. The respective units are located so as to cover the entire surface of the pool and, preferably, the periphery or edge marginal regions of adjacent solar units touch or engage so that as much of the pool surface is covered as permitted by the particular geometry or shape of the unit. In the present example, a spherical solar unit 13 is illustrated; however, it is to be understood that other predetermined configurations may be employed such as discs, pellets, or the like. In this manner, a single air chamber is defined by the outer shell or material of the unit so that the unit is buoyant and floatable on the surface of the water. Preferably, each of the units or balls are of a diameter within the range of 1-2 inches.

The swimming pool 10 further includes an enclosure 14 which houses a conventional pump 15 and a conventional filter 16. The body of water in the pool 12 is in fluid communication with the pump via a passageway or conduit 17 which is connected at one end to a skimmer and at its opposite end to the pump 15. The passageway or conduit 17 also includes a valve 18 which communicates the conduit 17 with a main drain 20 located in the bottom of the pool. The main drain 20 communicates with the valve 18 via a conduit 21. Therefore, in a conventional manner, water is drawn from the pool via the skimmer 19 by the pump 15 and introduced to the filter 16. Water is also withdrawn from the pool through the main drain 20 by the pump 15 and combined with the water withdrawn from the skimmer 19 in the filter 16. The water is returned to the pool in a purified condition via return conduit 22. In a normal fashion, the skimmer 19 is employed for removing surface debris and foreign matter since the water is withdrawn from the surface of the pool.

In accordance with the present invention, a storage container or enclosure 23 is illustrated as being preferably installed underground beneath the surface of the surrounding coping or decking. The container 23 includes an access door or lid 24 and the container is employed for storing the plurality of solar units 13 as illustrated in general by the numeral 13'. The solar units are withdrawn from the surface of the pool 12 in a manner similar to that which is described immediately above. A skimmer 19 is employed for collecting the multiplicity of solar units and transporting the units to the interior of the storage container 23. When it is time to dispurse the units onto the surface of the pool, another outlet 26 is provided. The intake 19 and outlet 26 are understood to be at the surface of the body of water so that the solar units may be readily withdrawn and dispersed back to the surface of the pool.

Figure 2:
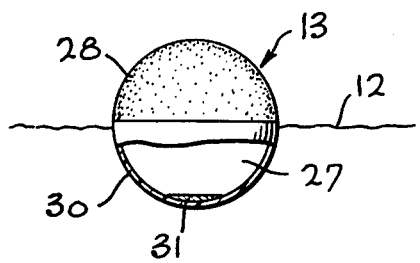
FIG. 2 is a cross sectional view of a typical ball, pellet or unit employed in the apperatus of the present invention.

Referring now in detail to FIG. 2, the solar unit 13 is illustrated which is of a spherical geometry and includes a thin wall or membrane that defines a single air chamber therein. The air chamber or interior of the unit is broadly illustrated by the numeral 27. Preferably, the top of the unit 13 is coated or painted black 28 while the undersurface or bottom of the unit is of a clear composition identified by numeral 30. Also, to maintain this relationship a suitable weight 31 is provided so that the black top portion 28 of the unit 13 will always face above the surface of the body of water to interfere with the impingement of sun rays. The black surface or portion 28 absorbs the impinging sun rays and also prevents radiation of heat back into the atmosphere from the water. The air chamber or space within the sphere establishes an air insulation so that there is no heat transfer through the unit from the water into the ambient air. Also, the solar unit 13 separates the ambient air from the surface of the water so that wind conditions cannot draw heat from the pool surface.

Figure 3:
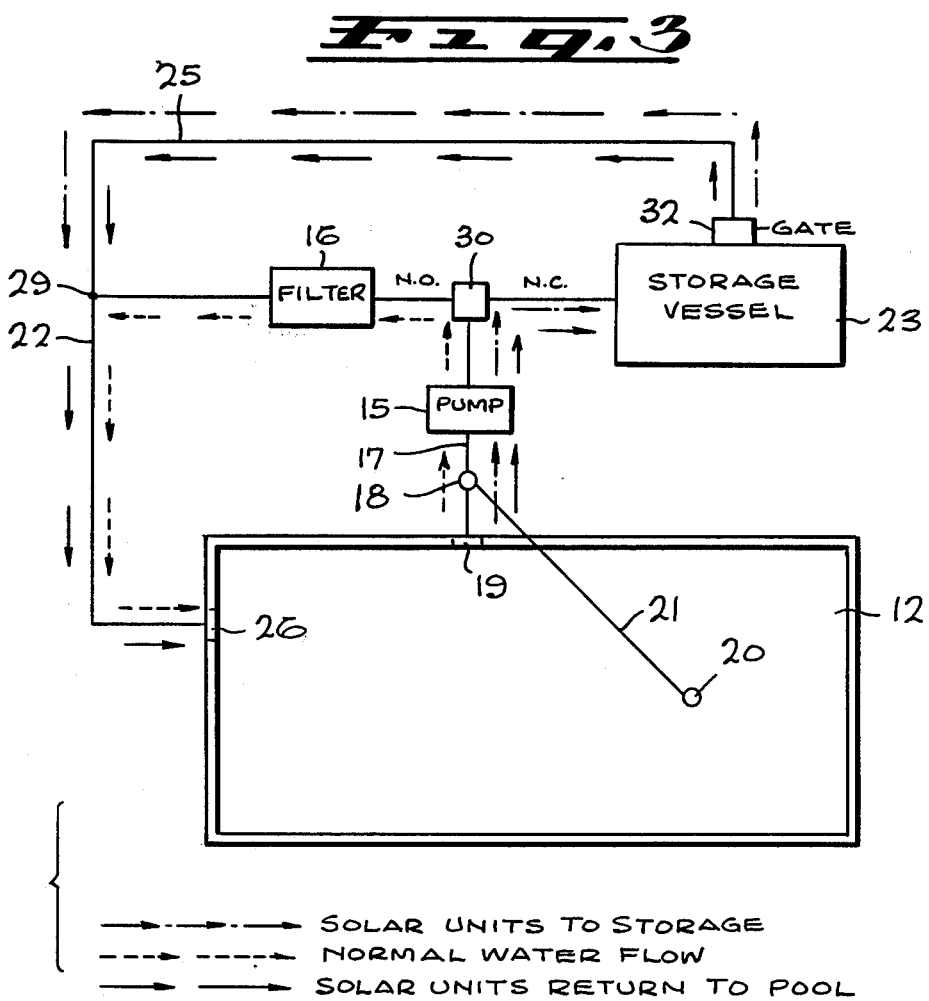
FIG. 3 is a diagrammatic view of the collection and dispersal system for gathering and deploying the multiplicity of solar units.

Referring now in general to FIG. 3, the conventional pool pump and filtering system described with respect to FIG. 1 is again illustrated by use of the same reference numerals and characters. However, it is to be noted that the collection, storage and dispersal system for the units 13 is illustrated in solid lines wherein the inlet 19 is connected to one end of a conduit or passageway 17 having its opposite end connected with the interior of the storage vessel 23. For returning the units to the pool, a conduit 25 connects the storage vessel or container 23 with the outlet 26 via conduit 22 and joint 29. Conduit 22 may include the pump 15 is desired. The pump is employed for both withdrawing the units from the surface of the pool and for distributing the units back to the surface. Preferably, the pump forcibly urges the units through its interior and through the conduits. Suction for withdrawing the units 13 from the surface of the pool is provided by the pump 15 through the water in the storage vessel 23 and the water in the conduit 22. In this matter, a single pump may be employed for withdrawing and displacing the units or pellets to and from the pool.

Referring in detail to FIG. 3, a diverter valve 30 is operably disposed between the filter 16 and the storage vessel 23. The valve is normally open to interconnect a fluid flow between the pump and the filter so that normal water filtering can take place with normal return of the filtered water through joint 29, conduit 22 and outlet 26. Normal recirculation is illustrated by the dotted line arrows.

Removal of the solar units from the surface is achieved by closing valve 30 to block the water flow from passing into the filter. Pumping action draws the solar units through inlet 19 and passed the diverter valve into the storage vessel 23. At this time, a screen type gate 32 is closed to maintain the solar units in the vessel. However, water flow may continue through the gate and return to the pool via conduits 25 and 22 and outlet 26. This latter flow is shown in the form and direction of the dot and dash arrows.

The solar units are returned to the pool surface by opening gate 32 so that the units within the vessel are carried out of the vessel with the flow of the water. The units are returned through the system return lines and the outlet 26. The return flow of the solar units is illustrated by the direction of the elongated arrows. It is noticed that the pump may be located on the output side of the system and that the operation would be as previously described. A diverter valve may be used in place of the joint 29 is desired. In some instances, more positive pressure for moving the solar units through the system is achieved by the closure of the valve.

Therefore, it can be seen that the solar heating apparatus of the present invention provides a novel cover for the surface of a swimming pool whereby the sun's rays are translated into heat for raising the temperature of the water and provides a means for preventing loss of heat through return of energy to the ambient air. The plurality of solar heating units 13 are stored in a container 23 and may be readily dispersed to cover the entire surface of the pool by pump 15 via conduit 22 and outlet 26. When it is desired to use the pool and to remove the solar heating units from the surface thereof, pump 15 and valve 30 is again actuated wherein the units will flow with the water into the inlet 19 and through conduit 17 into the storage vessel 23.

The solar heating units are buoyant and float in position on the surface of the water. Since the units are opaque on top, sunlight and sun rays are introduced to the air-filled compartment 27 of each unit. During hours of sunshine, the sun rays penetrate the upper surface of the units and heat the water beneath the apparatus. Since the air within the compartment is heated, there is also conduction heating of the water which lies adjacent to the apparatus. The apparatus provides a good insulating cover to hold the heat in the pool of water. Thus, the apparatus can be placed over the water surface during the day and the water will be warm and suitable for swimming. At night, the apparatus prevents excessive loss to the colder ambient air.

Figure 4:
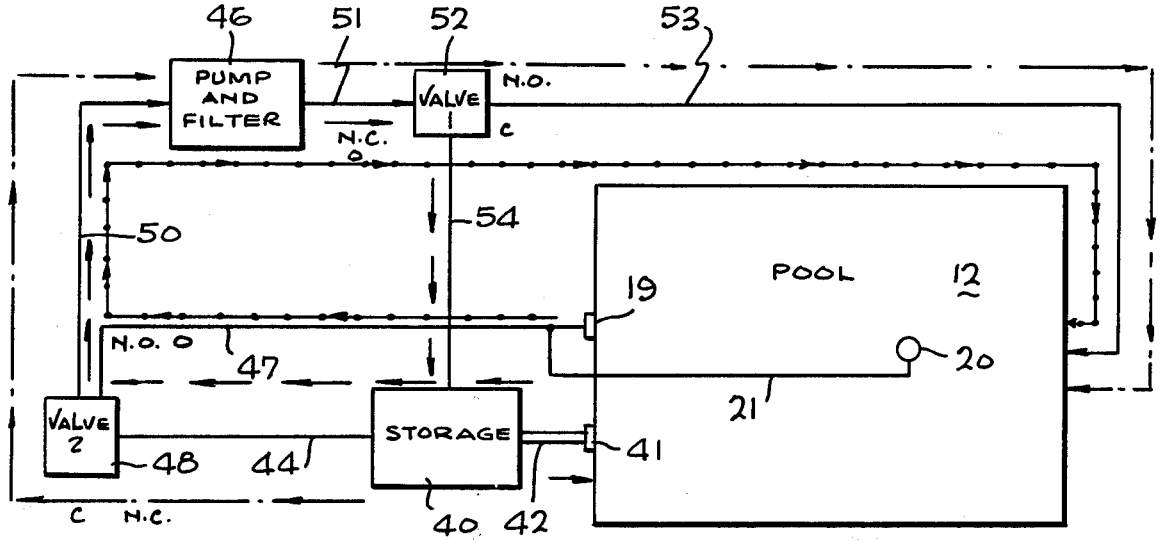
FIG. 4 is a diagrammatic view of another embodiment of the present invention illustrating the use of diverter valves.
Figure 5:
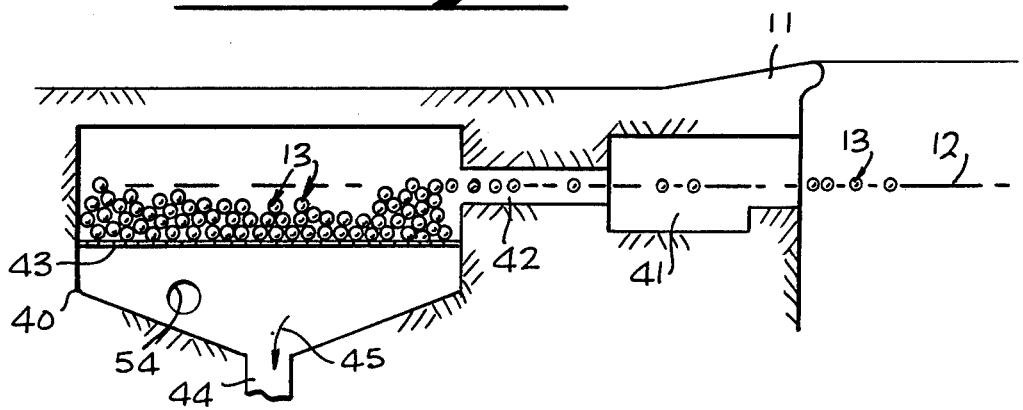
FIG. 5 is a cross sectional and enlarged view of a storage compartment employed in the solar heating apparatus shown in FIG. 4.

Referring now in detail to FIG. 4, another version of the present invention is illustrated wherein the solar heating units 13 are gatheted from the surface of the water body 12 and collected in a storage compartment 40. The compartment is shown more clearly in FIG. 5 wherein it is connected to a weir or second skimmer 41 via a conduit 42. A feature resides in the provision of a grating 43 which permits flow of water therethrough but is adapted to block passage of the units 13. As water is drawn through a conduit 44 by the pump, the water flow is from the pool through the weir 41, conduit 42 and into the compartment 40. The units will pile or distribute themselves on the grating after being drawn from the pool along with the flow of water. Such a pile is shown in FIG. 5 when the water flow is in the direction of arrow 45.

In further detail, FIG. 4 shows a conventional pump and filter 46 and water flow during a normal filtering operation draws pool water via skimmer 19 into a pipe 47 and through a normally open diverter valve 48 into the filter 46. Filtered water is then returned to the pool via conduit 51, normally open valve 52 and through conduit 53 and back to the pool.

However, when it is desired to collect the units from the pool surface, valve 48 is closed so that withdrawal of water and the units is via skimmer 41 and conduit 42. As water flow continues through compartment 40 and out through conduit 44, the units will collect on the grate 43. The water flow continues through valve 48, conduit 50, filter 46, conduit 51, open valve 52 and conduit 53 back to the pool.

To dispense the solar units back across the pool surface, diverter valve 48 is open to conduit 47 and closed to conduit 44 while diverter valve 52 is closed to conduit 53 and opened to a conduit 54 interconnecting with the storage compartment 40. Water flow is through skimmer 19, conduit 47, valve 48 and conduit 50 to filter 46. Water flow is then via conduit 51 through valve 52, conduit 54 and directly into the storage compartment. The water pressure and direction of flow is such to urge the solar units 13 out of the compartment and through conduit 42 passed skimmer 41 into the pool.

Therefore, in the apparatus of FIG. 4, pool water is continuously urged through the filter even during solar unit collection and dispersal. During gathering of the units, the main drain withdrawal of water is not used so that full pump pressure is used to gather the units through skimmer 41 and conduit 42.

While particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

What is claimed is:

1. A buoyant solar heating apparatus in combination with a pool for holding a body of water between opposite sidewalls and end-walls, comprising:

a plurality of separate individual solar heating units having a predetermined complimentary configuration for arrangement about the surface of said body of water so that adjacent ones of said units contact each other at the periphery of said adjacent units;

said bottom surface being translucent and said top surface being opaque whereby the short wavelength rays of the sun pass through said bottom surface for absorption by said body of water and the longer wavelength rays emitted by said body of water are blocked so that the short wavelength rays are readily converted to heat which is maintained on the surface of the body of water;

storage means for holding said plurality of solar heating units;

collection means connected between said body of water and said storage means for gathering said solar heating units;

dispersing means connected between said storage means and said body of water for returning said solar heating units to the surface of said body of water; and said storage means includes a below the surface of the ground container having an apertured grating separating an inlet duct connected to a skimmer and an outlet duct whereby said solar units collect on top of said grating during the collection mode of operation.

2. The invention as defined in claim 1 wherein a diverter valve is operably coupled between a pump and filter means and said storage means and a second diverter valve is operably coupled between said storage means and a normal water return line to the pool.

3. The invention as defined in claim 1 including:

a pump and filter means having an input conduit connecting with said pool and an output or return conduit connecting with said pool;

said storage means interconnected between said pool and said input conduit via a first diverter valve;

a second diverter valve interconnected via a conduit between said pump and filter means and said storage means.

4. A buoyant solar heating apparatus in combination with a pool for holding a body of water between opposite sidewalls and end-walls, comprising:

a plurality of separate individual solar heating units having a predetermined complimentary configuration for arrangement about the surface of said body of water so that adjacent ones of said units contact each other at the periphery of said adjacent units;

said bottom surface being translucent and said top surface being opaque whereby the short wavelength rays of the sun pass through said bottom surface for absorption by said body of water and the longer wavelength rays emitted by said body of wter are blocked so that the short wavelength rays are readily converted to heat which is maintained on the surface of the body of water;

storage means for holding said plurality of solar heating units;

collection means connected between said body of water and said storage means for gathering said solar heating units;

dispersing means connected between said storage means and said body of water for returning said solar heating units to the surface of said body of water; and said collection means and said dispersing means include an inlet for initially conducting said units from said body of water;

a pump connected to said inlet;

an outlet for conducting said units back to said body of water;

a filter connected to said outlet;

a diverter valve coupling said pump between said filter and said storage means whereby flow is directed to either said filter or said storage means.

5. The invention as defined in claim 4 wherein:

each of said units has a top opaque surface and a bottom clear surface of thin plastic material to define an ambient interior air-filled compartment.

6. A buoyant solar heating apparatus in combination with a pool for holding a body of water between opposite sidewalls and end-walls, comprising:

a plurality of separate individual solar heating units having a predetermined complimentary configuration for arrangement about the surface of said body of water so that adjacent ones of said units contact each other at the periphery of said adjacent units;

said bottom surface being translucent and said top surface being opaque whereby the short wavelength rays of the sun pass through said bottom surface for absorption by said body of water and the longer wavelength rays emitted by said body of water are blocked so that the short wavelength rays are readily converted to heat which is maintained on the surface of the body of water;

storage means for holding said plurality of solar heating units;

collection means connected between said body of water and said stroage means for gathering said solar heating units;

dispersing means connected between said storage means and said body of water for returning said solar heating units to the surface of said body of water;

each of said solar heating units is a hollow spherical unit;

said dispensing means and said collection means includes a conduit for transporting said units between said body of water and said storage means;

a pump operably coupled in said conduit associated with said dispensing means for forcibly urging said solar heating units through said conduits;

said storage means is located adjacent said body of water beneath the ground level; and a diverter valve interconnecting said pump to a filter and to said storage means.

* * * * *